(12) United States Patent
Chen et al.

(10) Patent No.: US 7,674,047 B2
(45) Date of Patent: Mar. 9, 2010

(54) ANTI-WIGGLE OPTICAL RECEPTACLE

(75) Inventors: Jianyao Chen, Milpitas, CA (US);
Frank Yashar, Cupertino, CA (US)

(73) Assignee: Opnext, Inc., Eatontown, NJ (US)

( * ) Notice: Subject to any disclaimer, the term of this patent is extended or adjusted under 35 U.S.C. 154(b) by 0 days.

(21) Appl. No.: 12/409,200

(22) Filed: Mar. 23, 2009

(65) Prior Publication Data

US 2009/0180738 A1    Jul. 16, 2009

Related U.S. Application Data

(63) Continuation of application No. 11/859,229, filed on Sep. 21, 2007, now Pat. No. 7,563,034.

(51) Int. Cl.
*G02B 6/38* (2006.01)
*G02B 6/36* (2006.01)

(52) U.S. Cl. .............................. 385/66; 385/55; 385/58; 385/60; 385/67; 385/68; 385/70; 385/72; 385/75; 385/76; 385/78; 385/84

(58) Field of Classification Search .................. 385/55, 385/58, 60, 66, 67, 68, 70, 72, 75, 76, 78, 385/84
See application file for complete search history.

(56) References Cited

U.S. PATENT DOCUMENTS

| | | | |
|---|---|---|---|
| 5,243,681 A * | 9/1993 | Bowen et al. ................ | 385/140 |
| 6,048,103 A * | 4/2000 | Furukata et al. .............. | 385/73 |
| 6,599,027 B2 * | 7/2003 | Miyake et al. ................ | 385/78 |
| 6,840,684 B2 * | 1/2005 | Melchior et al. .............. | 385/66 |
| 6,905,252 B2 * | 6/2005 | Wisecarver ................... | 385/55 |
| 7,090,412 B2 * | 8/2006 | Kato et al. .................... | 385/93 |
| 7,387,450 B2 * | 6/2008 | Nakanishi et al. ............. | 385/88 |
| 2004/0037509 A1* | 2/2004 | Wisecarver ................... | 385/55 |

\* cited by examiner

*Primary Examiner*—Ryan Lepisto
(74) *Attorney, Agent, or Firm*—Kaplan Gilman & Pergament LLP

(57) ABSTRACT

A casing includes a solid sleeve and a split sleeve in combination to provide a connection between a fiber stub and a ferrule containing an optical fiber. The arrangement prevents wiggle of the ferrule, and also does so without the tight tolerances that would otherwise be required in solid sleeve systems.

5 Claims, 3 Drawing Sheets

ANTI-WIGGLE OPTICAL RECEPTACLE

CROSS-REFERENCE TO RELATED APPLICATIONS

This application is a Continuation of U.S. patent application Ser. No. 11/859,229, filed Sep. 21, 2007, which has matured into U.S. Pat. No. 7,563,034 and which is incorporated by reference herein in its entirety.

TECHNICAL FIELD

This invention relates to a method and apparatus for providing a connection between an optical fiber and an optical subassembly. The invention has particular applicability in aligning a fiber connector with a fiber stub inside a receptacle.

BACKGROUND OF THE INVENTION

Pluggable fiber optic transceiver modules having form factors with names such as Xenpak, X2, XFP and SFP use receptacles to connect the optical subassemblies with optical fiber cables for optical signal transmission into and out of the transceiver. To align the connector of the optical fiber with the fiber stub inside the receptacle for better optical signal transmission, two styles of centering bores are usually used: solid and split-sleeve. We refer to these types of centering bores as solid sleeves and split sleeves, respectively. These centering bores are configured to have a fiber stub at one longitudinal side, and a ferrule with an optical fiber attached thereto at the other side.

An example of such a solid sleeve is shown in FIG. 1. The solid bore sleeve 101 is completely rotationally symmetrical and constructed of a rigid ceramic material, typically Zirconia. Due to fabrication tolerances the diameter of the solid sleeve can not be made exact, or at the very least, it is difficult to do so. Therefore, the inner diameter of the sleeve 101 must be made slightly larger than the outer diameter of the connector ferrule to be inserted (not shown). This gap can be up to 2 µm.

This configuration is not able to give a very stable and repeatable optical connection for the optical fiber connector with the fiber stub 102, because the connector ferrule can move with the sleeve such that the center of the optical fiber in the ferrule may become off center with respect to the center of the fiber in the optical stub 102. This "offset" changes the light power transmitted, causing degraded performance and potential errors.

A split sleeve bore 201 as shown in FIG. 2, in contrast, is separated lengthwise along the cylindrical wall by a slot 202, and is made with an inner diameter slightly smaller than the diameter of the connector ferrule. This split sleeve structure is more flexible and is therefore able to enlarge its inner diameter slightly to accommodate the diameters of the fiber stub and ferrule. When the ferrule (not show) is inserted, the split sleeve can expand and then clamp down on the inserted ferrule, thereby accurately centering the connector ferrule with the fiber stub inside the receptacle.

However, when a side load is applied to connector ferrule, the split sleeve can expand and thereby allow a large tilt or even an offset of the connector ferrule which will cause a misalignment between the two fiber cores and hence induce optical power variations in the connection. Essentially, to achieve the improved ability of the split sleeve over the solid sleeve, one must sacrifice the overall stability of the sleeve itself.

One prior art solution to the above problem is a stepped split sleeve. A stepped split sleeve has a variable wall thickness along the length thereof. Using a stepped thickness, the thicker end of the split sleeve bore is able to hold the fiber stub tightly and therefore the expansion of split sleeve only occurs at the thinner end of the bore. In this way, the amount of connector tilt inside the split sleeve bore can be effectively reduced. However, a stepped split sleeve is more difficult to fabricate and hence becomes more expensive than a regular split sleeve bore. Moreover, the stepped sleeve thickness can cause mechanical stress to concentrate around the step area when the split sleeve expands which can cause the split sleeve to crack.

Another method involves press fitting the split sleeve to the fiber stub to tightly couple it and decrease movement. However, mechanical stress can build up around the area where the split sleeve is tightly coupled to the fiber stub, thereby causing the ceramic material to crack. Moreover, press fitting a split sleeve together with fiber stub into the receptacle metal body requires extreme tolerance control of three parts, thereby increasing the cost of the assembly.

Other prior art methods exist, but all fail to provide an economical manner in which to obtain optimum alignment between the ferrule and the fiber stub. It is this issue to which the present invention is largely directed.

DETAILED DESCRIPTION OF THE PREFERRED EMBODIMENTS

An object of the present invention is to overcome the shortcomings of the prior art by providing a simple structure with a relatively low fabrication cost to provide high wiggle resistance in the receptacle.

Figure 1:
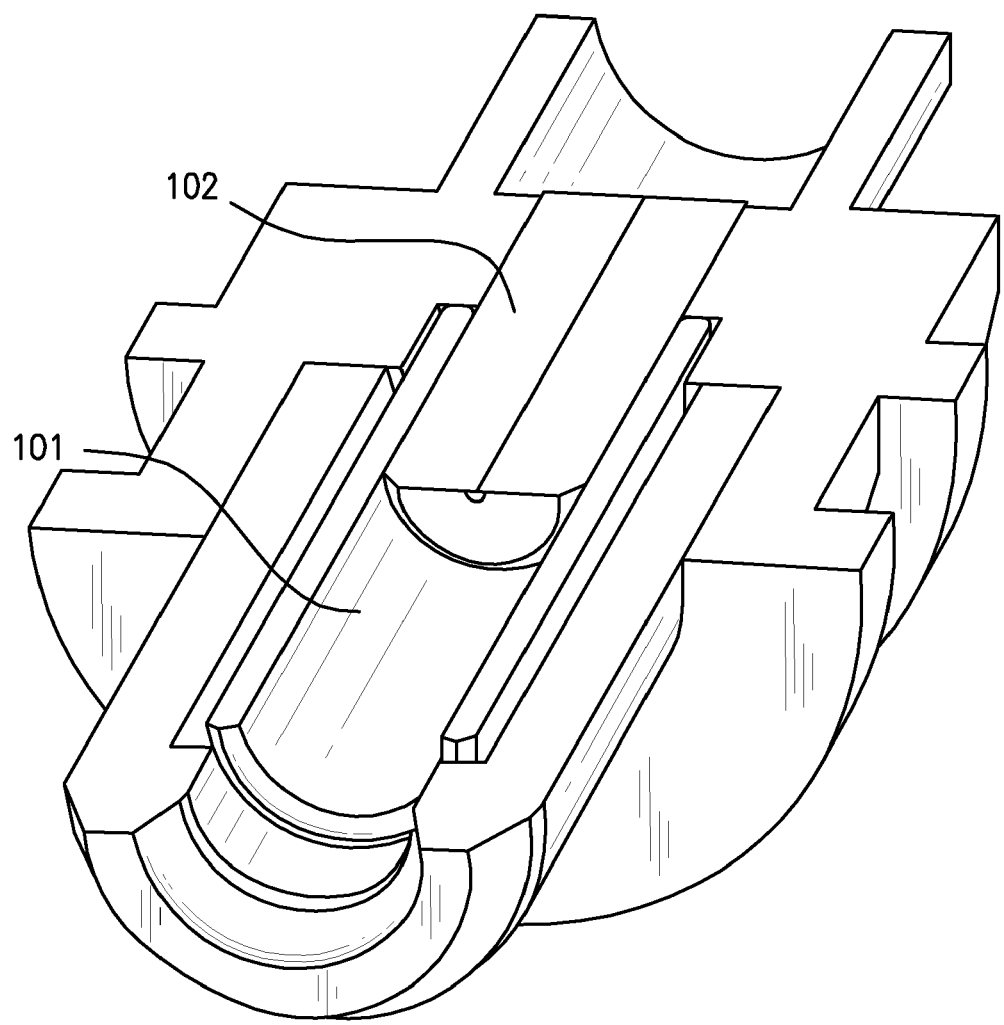
FIG. 1 is an example of a prior art solid sleeve embodiment.
Figure 2:
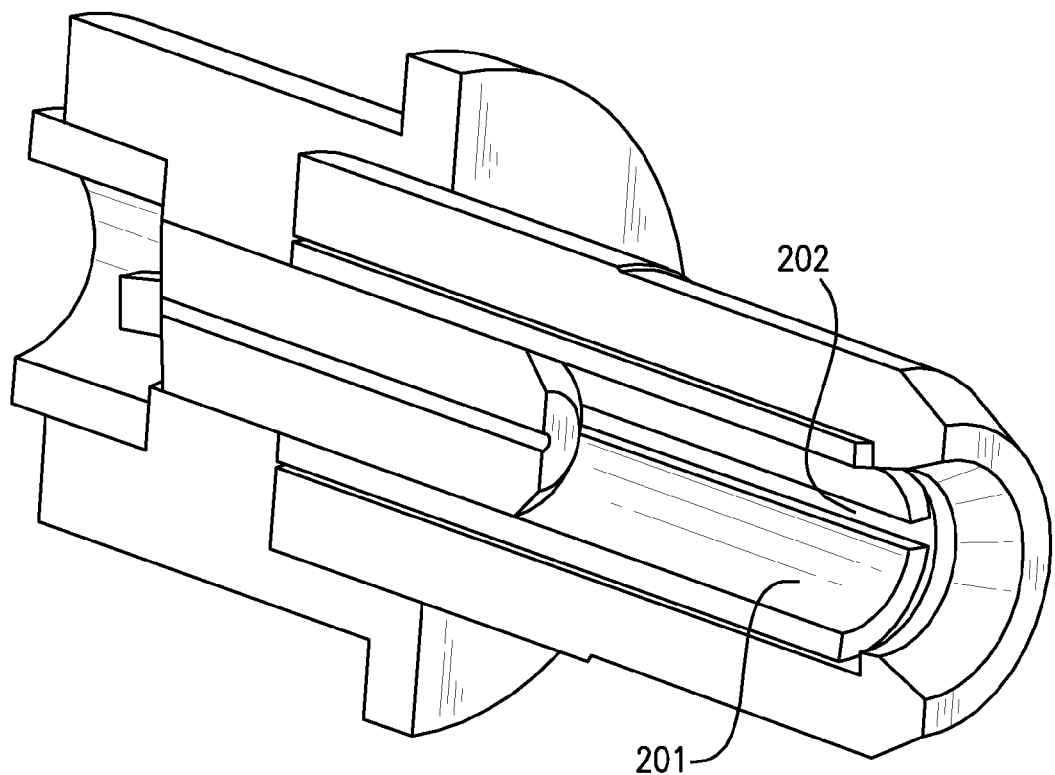
FIG. 2 is an example of a prior art split sleeve embodiment.
Figure 3:
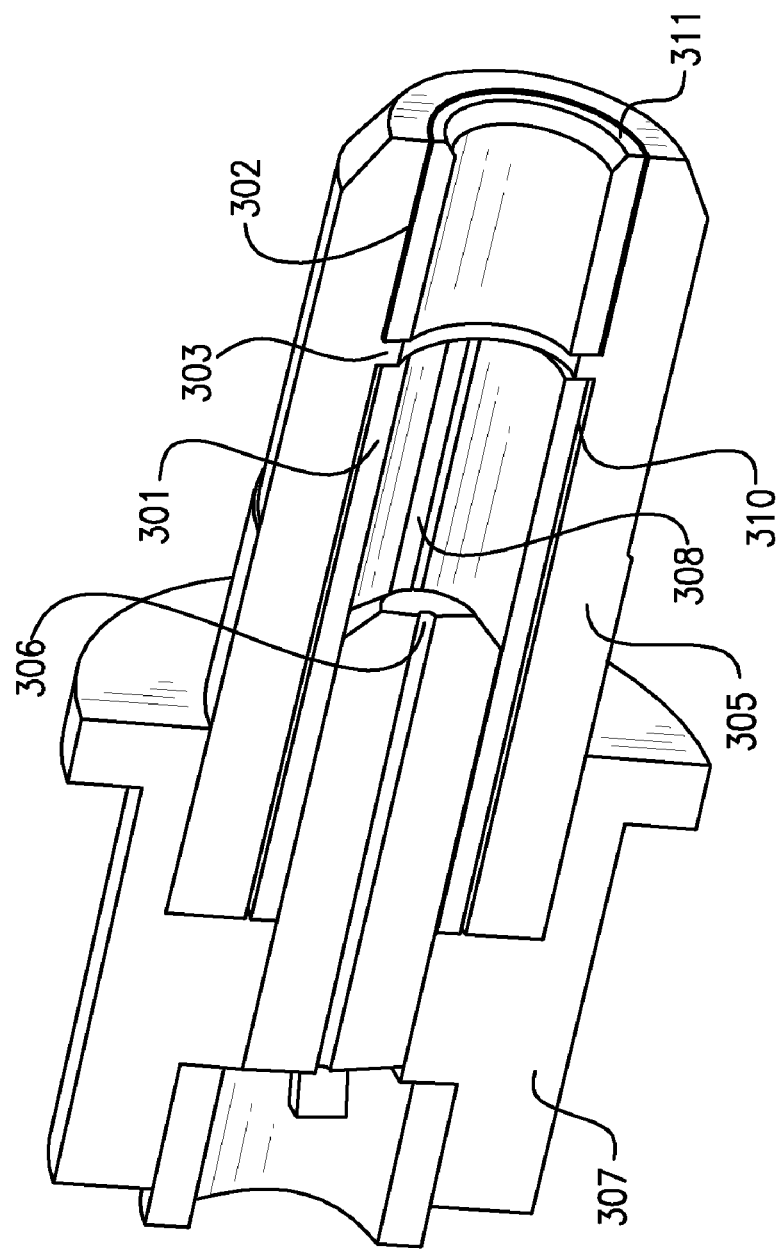
FIG. 3 is an exemplary embodiment of the present invention.

As shown in FIG. 3, one exemplary embodiment of the present invention includes a first and second casing portion 305 and 307, and a fiber stub 306. The split sleeve portion 301 is shown as having a slot 308. The first casing portion 305 includes optionally a flange 303 that runs partially or fully around the inner circumference of the first casing portion 305. A solid sleeve portion 302 is also shown.

The fiber stub 306 is positioned as shown within the casing 305, 307, and within the split sleeve portion 301. The flange 303 prevents the solid sleeve portion 302 from contacting the split sleeve portion 301 as the solid sleeve portion 302 may be pushed into the casing portion 305.

The inner diameter of the split sleeve portion 301 may optionally be slightly smaller than the inner diameter of solid sleeve portion 302. By having this slight optional difference in diameter, the system provides two advantages. First, the solid sleeve 302 does not have to be manufactured to exacting tolerances to avoid movement. If there is a little "play" between the inserted ferrule and the inner wall of solid sleeve 302, it does not matter all that much. This is because the distance between the end 310 of split sleeve 301 and the end 311 of solid sleeve 302 is such that any wiggle of the ferrule at the end portion 311 will not cause much movement of the ferrule at the end portion 310 of the split sleeve.

Additionally, by keeping the gap shown between the split sleeve 301 and the solid sleeve 302, the solid sleeve 302 will not be pushed against an end of the split sleeve, and thus, the split sleeve will be able to expand laterally. Absent the flange 303 of some other means of preventing the pressure induced by the solid sleeve portion 302 from obstructing the split sleeve portion 301, the ability of the split sleeve portion to expand, on both sides of the slot 308, might be diminished.

Preferably, although not necessarily, the solid sleeve portion 302 is shorter than the split sleeve portion. However, either portion may be shorter than the other, or both portions may be of equal length. Also, the slot 308 may run all or part of the length of split sleeve portion 301.

While the above describes the preferred embodiment of the invention, various other modifications and additions will be apparent to those of skill in the art. Such modifications are intended to be covered by the claims appended hereto.

The invention claimed is:

1. A device for aligning a connector ferrule with an optical stub, said device comprising a solid sleeve and a split sleeve in series, the solid and split sleeves being surrounded by a casing, a fiber stub being contained within the split sleeve, wherein said casing comprises a spacer between said solid sleeve and said split sleeve, said spacer extending into the space between the split and solid sleeves to prevent either from being pushed into the other, wherein the spacer has an internal diameter that is smaller than the outer diameter of the split sleeve.

2. The device of claim 1 wherein said spacer includes a flange integrally formed with said casing.

3. The device of claim 1 wherein the spacer is constructed to obstruct longitudinal movement of the split sleeve.

4. The device of claim 1 wherein the spacer is constructed to impinge on an outward longitudinal end of the split sleeve.

5. A device for aligning a connector ferrule with an optical stub, said structure comprising a solid sleeve and a split sleeve in series, the solid and split sleeves being surrounded by a casing, a fiber stub being contained within the split sleeve, wherein said casing comprises a spacer between said solid sleeve and said split sleeve, said spacer extending into the space between the split and solid sleeves to prevent either from being pushed into the other, wherein said spacer includes a flange integrally formed with said casing; and wherein said spacer includes at least two walls extending in a direction other than the longitudinal direction of said sleeves.

* * * * *